(12) United States Patent
Milano, Jr. et al.

(10) Patent No.: US 6,568,685 B2
(45) Date of Patent: May 27, 2003

(54) DYNAMIC ROTATING SEAL ASSEMBLY

(75) Inventors: Arthur J. Milano, Jr., Burlington, CT (US); Paul Dubreuil, Torrington, CT (US); Jeffery Bricker, Torrington, CT (US)

(73) Assignee: Seitz Corporation, Torrington, CT (US)

( * ) Notice: Subject to any disclaimer, the term of this patent is extended or adjusted under 35 U.S.C. 154(b) by 131 days.

(21) Appl. No.: 09/740,351

(22) Filed: Dec. 18, 2000

(65) Prior Publication Data

US 2002/0084592 A1 Jul. 4, 2002

(51) Int. Cl.[7] .............................. F16J 15/34; B01D 39/00
(52) U.S. Cl. ..................... 277/358; 277/369; 277/370; 277/377; 55/502; 55/510
(58) Field of Search ................................ 277/358, 361, 277/369, 370, 371, 372, 373, 377, 500; 55/510, 502

(56) References Cited

U.S. PATENT DOCUMENTS

| | | |
|---|---|---|
| 1,931,733 A | 8/1933 | Leibing |
| 2,279,669 A | 4/1942 | Friskney |
| 2,467,049 A | 4/1949 | Peterson |
| 2,560,557 A | 7/1951 | Curtis |
| 2,771,153 A | 11/1956 | Hennig |
| 2,916,313 A | 12/1959 | Ziller et al. |
| 3,599,990 A * | 8/1971 | Greiner et al. .............. 277/370 |
| 3,875,993 A * | 4/1975 | Penny ......................... 165/9 |
| 4,095,808 A * | 6/1978 | Glasson ...................... 277/372 |
| 4,415,167 A * | 11/1983 | Gits ........................... 277/373 |
| 4,457,521 A * | 7/1984 | Morley ........................ 277/380 |
| 5,516,121 A * | 5/1996 | Bolusset et al. ............. 277/319 |
| 5,797,602 A * | 8/1998 | Less ........................... 277/372 |
| 5,895,510 A * | 4/1999 | Butler et al. ................. 55/502 |
| 5,954,341 A * | 9/1999 | Ringer et al. ............... 277/361 |
| 6,328,528 B1 * | 12/2001 | Dahlheimer ................ 277/370 |
| 6,398,223 B1 * | 6/2002 | Radosav ..................... 277/352 |

* cited by examiner

*Primary Examiner*—Anthony Knight
*Assistant Examiner*—Vishal Patel

(57) ABSTRACT

A fluid and/or gas treatment unit containing a dynamic rotating assembly for passage of a fluid and/or gas therethrough comprises a housing having a generally cylindrical body and end walls, and a generally cylindrical member rotatable in the chamber and having a peripheral wall and end surfaces. A shaft extends coaxially through coaxial apertures in the housing end walls, and through a coaxial passage in the rotatable member with which it is engaged to rotate as a unitary assembly. Adjacent the inner surface of each end wall of the housing are, seriatim, a resiliently deflectable biasing element, a generally circular wear plate and a resiliently compressible, generally circular sealing member between the wear plate and the cylindrical member and rotatable therewith. A generally circular bearing member extends about the generally circular sealing member and the cylindrical member and is rotatable therewith. The wear plates bear against the bearing members and the sealing members, and the sealing members are resiliently compressed between the cylindrical member and the wear plates to a controlled extent.

16 Claims, 5 Drawing Sheets

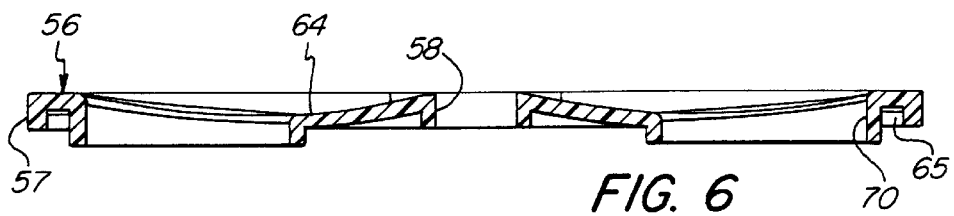
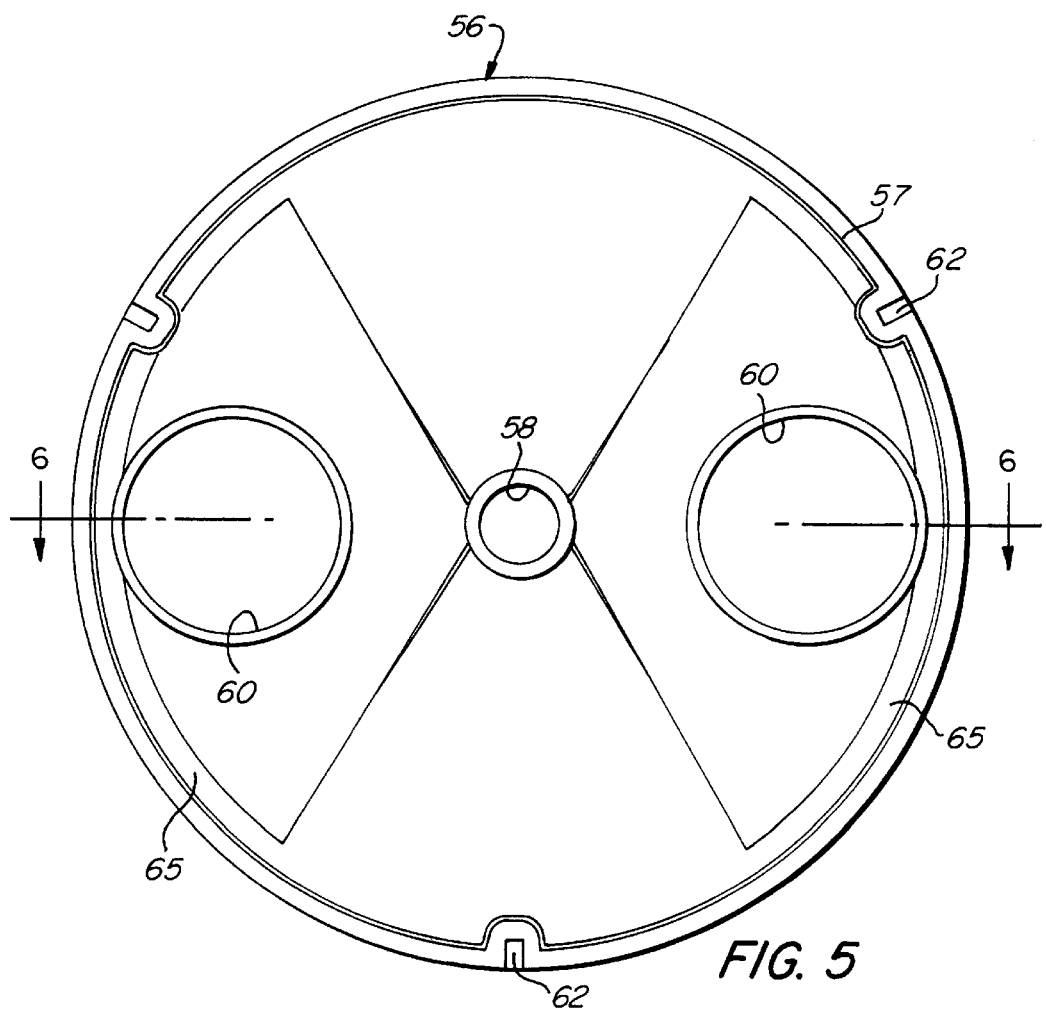

DYNAMIC ROTATING SEAL ASSEMBLY

BACKGROUND OF THE INVENTION

The present invention relates to dynamic rotating seal assemblies of the type which may be used in devices for the treatment of fluids and gases.

In various processes, fluids and gases such as water and air are passed through chambers in which they are subjected to some form of treatment such as chemical reaction, irradiation, drying, cooling and the like. When the treatment unit is static, the problem of effecting a sealing action for the device providing the treatment chamber is relatively easily addressed. However, if the treatment unit includes a rotating device which is providing the effective treatment element, there is considerably more difficulty in providing an effective durable seal between the rotating element and the container providing the chamber in which it is rotating and about the openings for the inlet and outlet and for the drive shaft. In this instance, the seal must be effective during the dynamic rotation of the components and avoid significant wear on the sealing elements isolating the fluids or gases which are passing through the rotating element. Fairly complex structures have frequently been utilized to provide effective sealing action between relatively wear resistant components utilized to provide such a seal.

It is an object of the present invention to provide a novel rotating seal assembly in a fluid and/or gas treatment unit incorporating a rotating treatment element.

It is also an object to provide such a seal assembly which can be fabricated relatively easily and economically and which is relative long lived.

Another object is to provide such a rotating sealing assembly in which the pressure exerted upon the components providing the sealing action is relatively uniform and controlled to minimize premature deterioration of a deflectable sealing element.

SUMMARY OF THE INVENTION

It has now been found that the foregoing and related objects may be readily attained in a fluid or gas treatment device containing a dynamic rotating assembly for passage of a fluid and/or gas therethrough comprising a housing having a generally cylindrical body and end walls extending across the ends thereof to define a generally cylindrical chamber therewithin. A generally cylindrical container member is rotatable within the chamber and has a hub and a peripheral wall. A shaft extends coaxially through coaxial apertures in the housing end walls and through the hub of the cylindrical container, and the shaft and cylindrical container are engaged to rotate as a unitary assembly.

Resiliently deflectable biasing elements are disposed within the chamber adjacent the inner surface of both housing end walls, and generally circular wear plates are disposed adjacent the inner surface of the biasing elements. Resiliently compressible, generally circular sealing members are disposed between the wear plates and both ends of the cylindrical container and are rotatable therewith.

Generally circular bearing members extend about the generally circular sealing members and about the cylindrical container and are rotatable therewith. The bearing members bear upon the wear plates and the circular sealing members bear against the wear plates and are resiliently compressed between the cylindrical container and the wear plates.

In the preferred embodiment, each of the housing end walls has a pair of flow apertures diametrically offset to opposite sides of the coaxial apertures in the housing end walls, and the sealing members have diametrically offset passages therethrough which will align with the offset apertures in the housing end walls to provide passages through the container and housing as the cylindrical container rotates to bring into alignment the housing apertures and the passages in the cylindrical container. The wear plates have apertures therein which are aligned with the offset apertures of the housing end walls.

Desirably, there are included sealing elements about the shaft in coaxial apertures of the housing end walls. The resiliently deflectable biasing elements and the circular sealing elements are preferably elastomeric. Each of the wear plates frusto-toroidal has a central web portion and a generally troidal portion extending thereabout to provide a convex surface disposed towards the adjacent biasing element. The opposing surface of the biasing element has a central web portion and a generally frusto-toroidal concave portion extending thereabout which substantially conforms to the convex portion of the wear plates.

The circular sealing members project axially only a small distance beyond the plane of the outer surface of the circular bearing elements and the bearing elements limit the compression of the sealing members.

The container is of wheel-like cross section with a hub providing the passage therethrough for the shaft and spokes dividing the interior of the container into a series of sectors.

The circular sealing members are of cooperating wheel like configuration and their spokes are seated on the spokes of the container.

BRIEF DESCRIPTION OF THE DRAWINGS

FIG. 5 is a plan view of the wear plate drawn to the same scale as the seal of FIG. 3;

FIG. 6 is a sectional view along the line 6—6 of FIG. 5;

DETAILED DESCRIPTION OF THE PREFERRED EMBODIMENT

Figure 1:
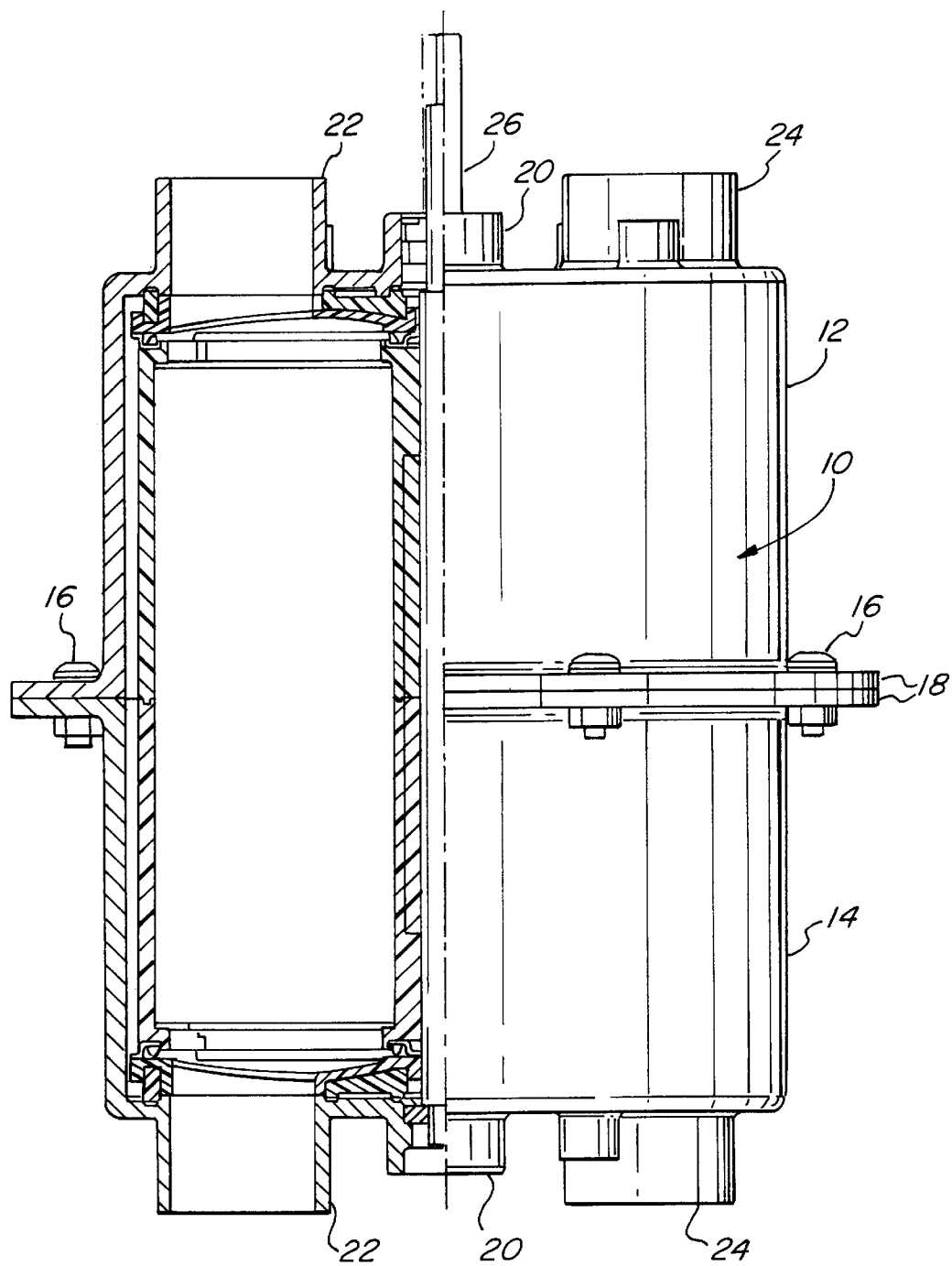
FIG. 1 is a partial sectional elevational view of a fluid and/or gas treatment unit employing a dynamic rotating flow through assembly embodying the present invention.
Figure 2:
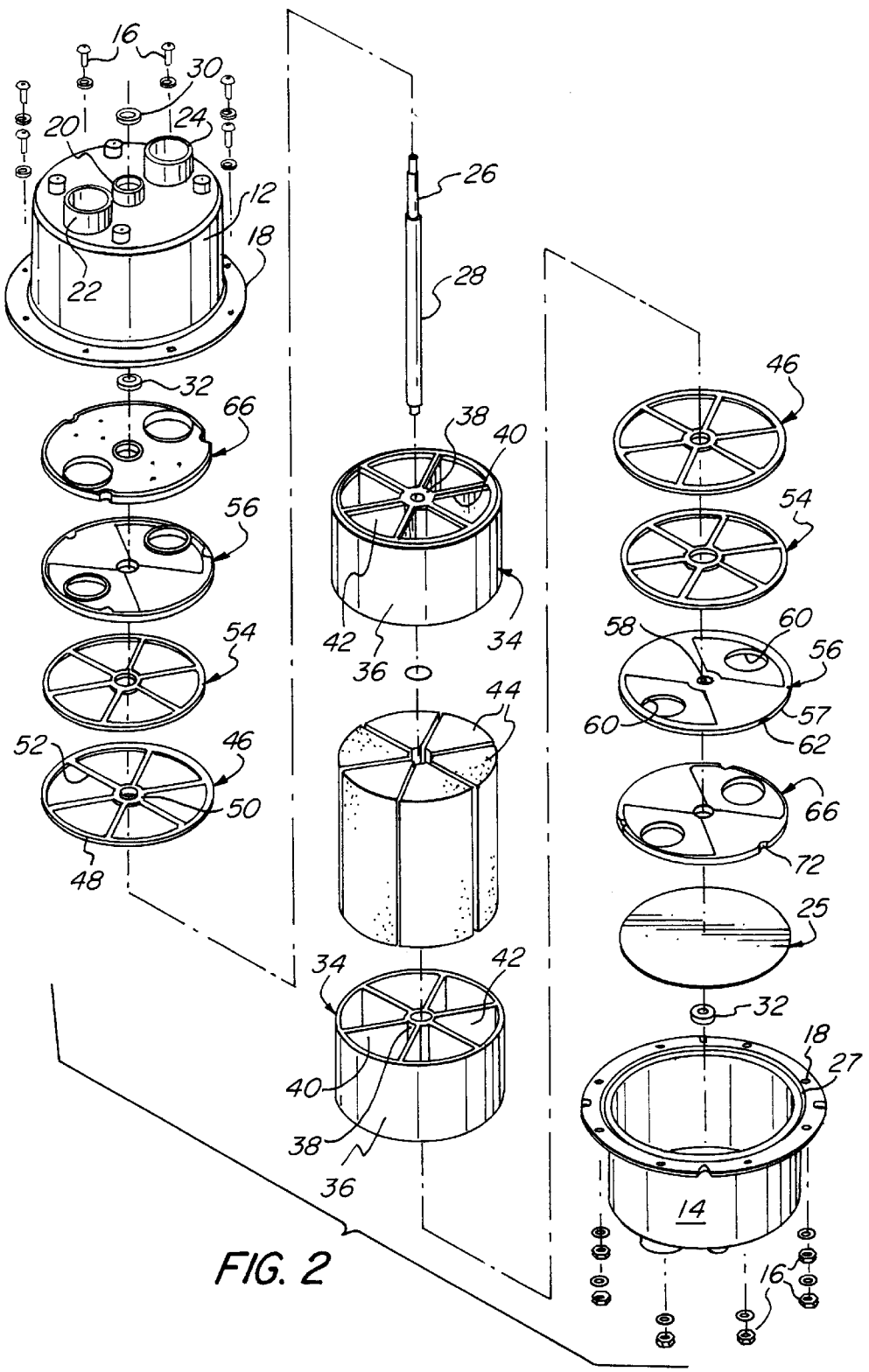
FIG. 2 is an exploded view of the components of the fluid and/or gas treatment unit.
Figure 4:
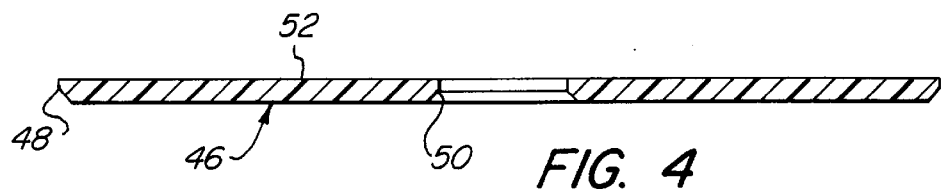
FIG. 4 is a sectional view thereof along the line 4—4 of FIG. 3.
Figure 3:
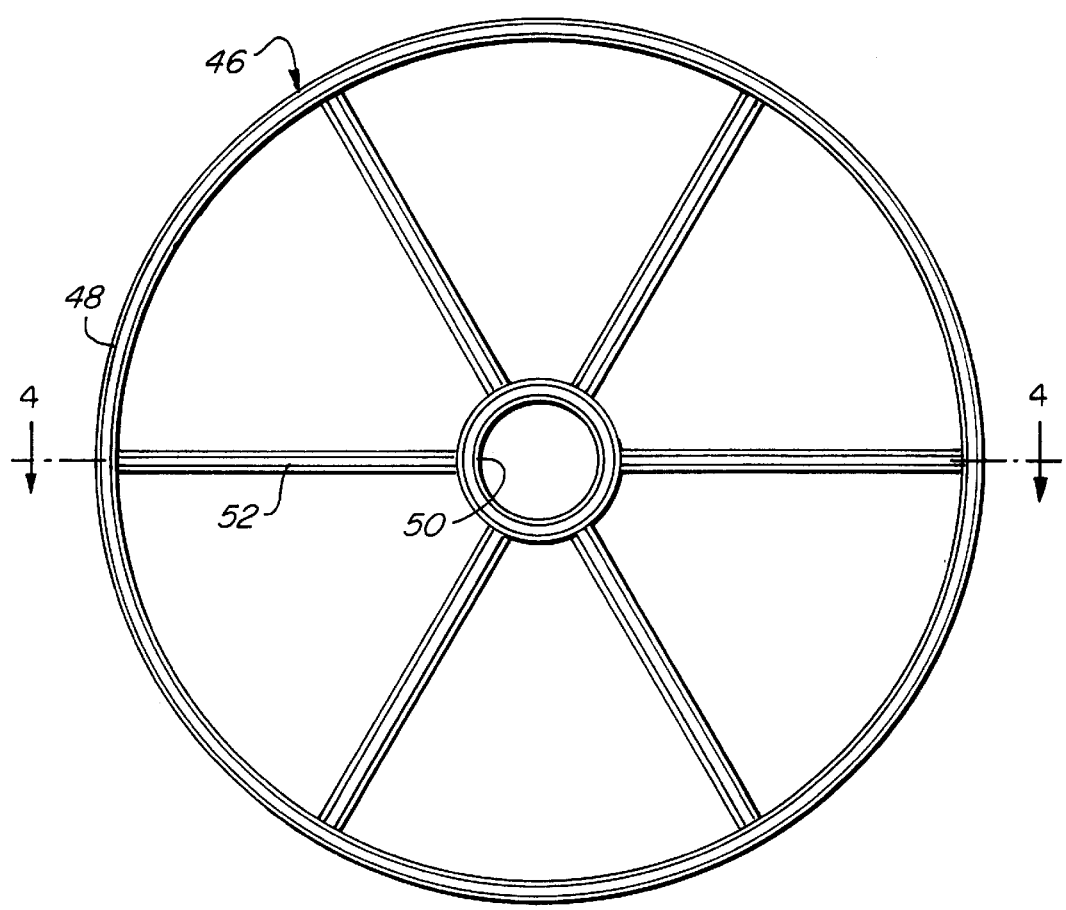
FIG. 3 is a plan view of the dynamic rotary seal drawn to an enlarged scale.
Figure 8:
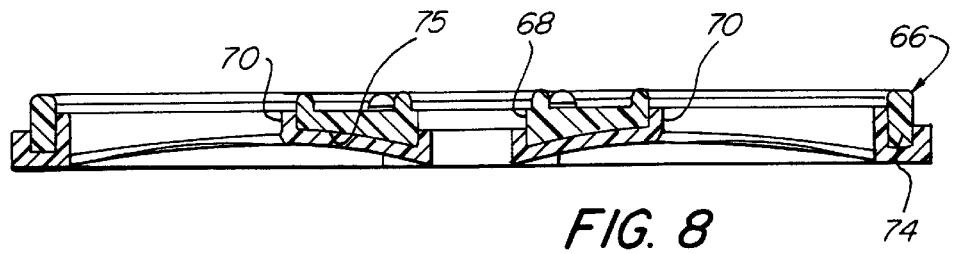
FIG. 8 is a cross sectional view of the assembly of the biasing member and wear plate along the line 8—8 of FIG. 7.
Figure 7:
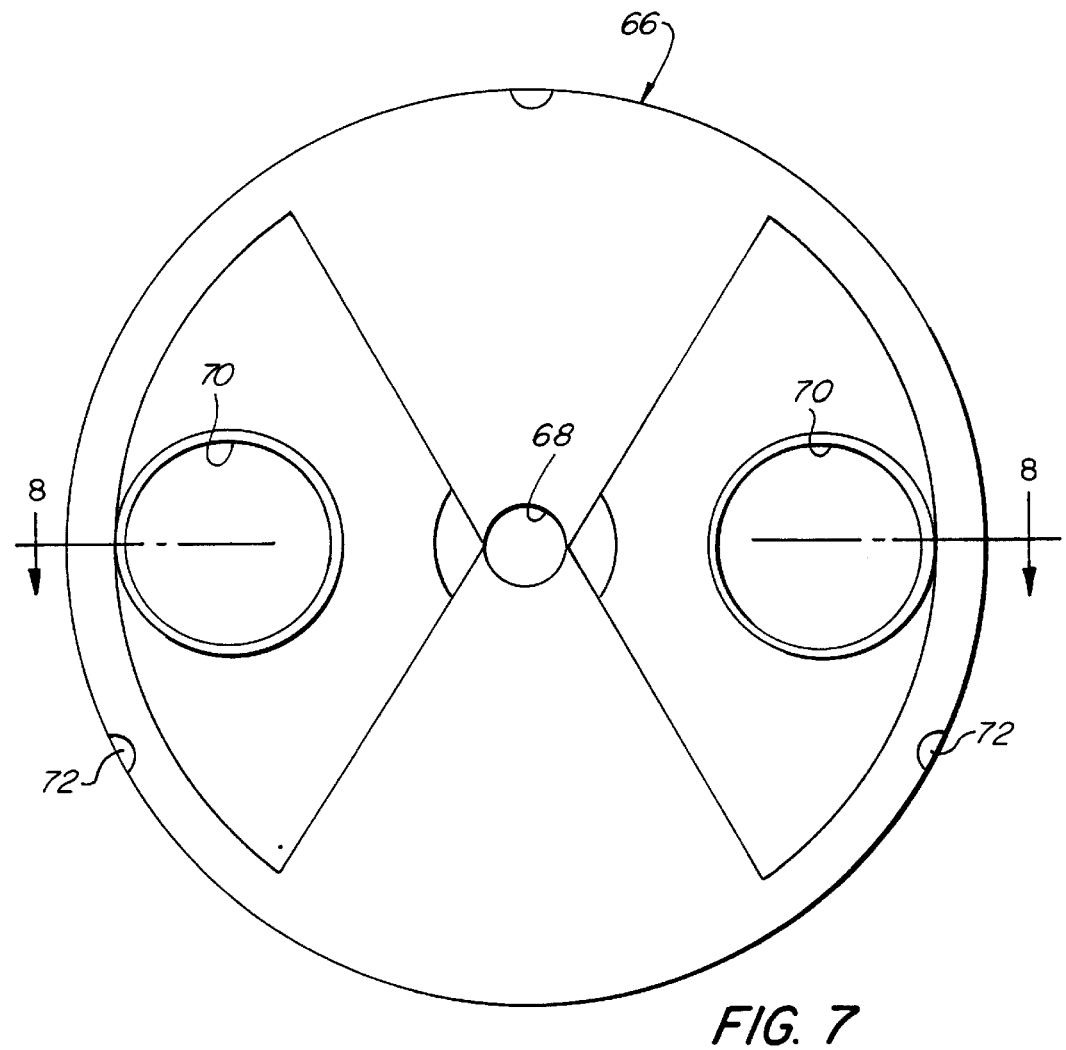
FIG. 7 is a plan view of the biasing member drawn to the same scale as FIGS. 3–6.

As seen in FIGS. 1 and 2 of the attached drawings, the fluid and/or gas treatment unit embodying the present invention includes a generally cylindrical housing generally designated by the numeral 10 and comprised of a pair of mating halves 12, 14 joined by fasteners 16 extending through abutting peripheral flanges 18. Each of the halves 12, 14 has a projecting coaxial cylindrical hub 20 and a pair of diametrically spaced cylindrical ports 22, 24 which are aligned to provide fluid and/or gas passages through the housing 10. An O-ring seal 25 is seated in opposed aligned recesses 27 in the flanges 18.

Extending through the housing 10 and rotatably supported in bearing seals 30 and bearings 32 in the hubs 20 is an elongated shaft generally designated by the numeral 26 with an intermediate portion 28 of hexagonal cross section. Mounted on the hexagonal portion 28 of the shaft 26 are upper and lower container members generally designated by the numeral 34 each having a circumferential wall 36, a hub 38 and radial walls or spokes 40 extending therebetween providing a wheel-like configuration which divides the interior space into six compartments 42. Seated in each of the compartments 42 of the coupled members 34 is an elongated cooperatively dimensioned and configured treatment element 44 through which the fluid and/or gas must pass between the ports 22, 24.

Disposed on the outer end faces of the container members 34 are resiliently compressible dynamic rotary sealing members generally designated by the numeral 46 and having an outer ring 48, a hub portion 50 and spokes 52 extending therebetween which are aligned with the radial walls 40.

Extending about the periphery of the outer end portions of the container members 34 are generally wheel-like synthetic resin bearings 54, which project axially beyond the plane defined by the outer ends of the container members 34 to limit the compression of the sealing members 46. This subassembly rotates with the shaft 26.

Bearing upon the sealing members 46 and bearings 54 are synthetic resin wear plates or discs generally designated by the numeral 56 which are generally circular with a peripheral portion 57, a coaxial aperture 58 through which the shaft 26 extends, a pair of diametrically spaced circular apertures 60 which are aligned with the ports 22, 24, and circumferentially spaced recesses 62 in the periphery thereof.

As best seen in FIG. 6, the outwardly disposed surface of the discs 56 has a web portion between the coaxial aperture 58 and the peripheral portion 57 providing a generally frusto-toroidal convex surface portion 64 which is arched toward the end wall of the housing 10. The discs 56 also have a arcuate channel 65 in the peripheral portion 57.

Biasing the wear plates 56 against the sealing members 46 and bearings 54 are elastomeric discs generally designated by the numeral 66. They have a coaxial aperture 68 through which the shaft 26 passes, and diametrically spaced flow apertures 70 which are aligned with the ports 22, 24. The periphery has three recesses 72 spaced thereabout which are aligned with the recesses 62 of the wear plate 56, and a circumferential lip 74 which intermeshes with the channel formation 65 on the wear plate 56. The surface opposing the wear plate 56 has a generally semi-toroidal concave recessed portion 75 corresponding to the convex surface 64 of the wear plate 56.

The inside surfaces of the housing halves 12, 14 have axially extending ribs (not shown) which extend into the recesses 62, 72 of the wear plate 56 and discs 66 to prevent relative rotation.

As will be appreciated, the elastomeric discs 66 resiliently bias the wear plates or discs 56 against the rotary sealing member 46 and bearing 54 which are rotating relative thereto. The bearing 54 limits the axial deflection or compression of the rotary sealing member 46, preferably to about 0.010–0.030 inch.

In one application for the rotating flow through assembly of the present invention, the device functions to recover moisture and heat from an air stream exhausted from a fuel cell entering through the lower port 22. As the air stream passes through the treatment elements 44 of the rotating container sub-assembly (34, 46 and 56), the moisture and heat are extracted before the air stream exits the upper port 22. A stream of cooler dry air enters through the upper port 24 and is heated and extracts moisture as it passes through the treatment elements to the lower port 24. This extracted heat and moisture can then be used in the fuel cell operation.

The housing and container sections are preferably made of metal such as stainless steel and aluminum to provide strength and corrosion resistance. However, synthetic resins such as acetals and polycarbonates, and ceramics may also be employed.

The sealing member is fabricated from an elastomeric resin with good resistance to chemicals and moisture such as EPDM with a diameter of about 40–60 on the Shore D scale. The thickness is desirably about 0.1–0.3 inch depending upon the compressive forces to be applied.

The wear plate and the bearing may be desirably fabricated from a low friction, durable synthetic resin such as tetrafluorethylene, acetal or other similar resins and alloys of resins. Alternatively metals such as stainless steel and bronze may also be employed. A thickness of about 0.2–0.6 inch will normally be satisfactory.

The spring or biasing element is desirably fabricated from an elastomeric resin with good chemical resistance to chemicals and moisture such as EPDM and polyurethane. Preferably it has a durometer of about 30–40 on the Shore D scale. A thickness of about 0.3 to 0.5 inch will normally be sufficient to provide a member with a long life.

An example of an unit embodying the illustrated embodiment of the present invention is one used to recover heat and moisture from the air being drawn from about the stack of a fuel cell. The outer housing has a diameter of 8 inches and an axial length of 12 inches providing a cavity with an axial length of about 11 inches. The container has a diameter of 7.5 inches and. The filter or treatment inserts contain zeolite or equivalent absorbent materials.

The seal has a thickness of 0.300 inch, and the bearing has a thickness of 0.260 inch so that the compression of the seal is limited to not more than 20%.

The exhaust from the fuel cell is passed into the entrophy wheel in which the moisture and sensible heat and humidity are absorbed by the filter elements which then rotate into the path of the incoming air supply. The incoming air picks up the sensible heat and humidity from the filter elements and then passes into the fuel cell.

Thus, it can be seen from the foregoing specification and attached drawings that the dynamic rotary seal assembly may be readily fabricated and will exhibit relatively long life due to the improvement in wear characteristics of the assembly.

Having thus described the invention, what is claimed is:

1. A treatment device containing a dynamic rotating assembly for passage therethrough of fluids and gases, comprising:

(a) a housing having a generally cylindrical body and end walls extending across the ends thereof to define a chamber therewithin;

(b) a generally cylindrical container in said chamber and rotatable therewithin, said container having a hub and a peripheral wall;

(c) a shaft extending coaxially through coaxial apertures in said housing end walls and through said hub of said cylindrical container, said shaft and cylindrical container being engaged to rotate as a unitary assembly;

(d) resiliently deflectable biasing elements adjacent the inner surface of said housing end walls;

(e) generally circular wear plates adjacent the inner surface of said biasing elements;

(f) resiliently compressible generally circular sealing members between said wear plates and the ends of said cylindrical container and rotatable therewith; and (g) generally circular bearing members extending about said generally circular sealing members and about said cylindrical container and rotatable therewith, said bearing members bearing upon said wear plates and said circular sealing members bearing against said wear plates and being resiliently compressed between said cylindrical container and said wear plates.

2. The treatment device in accordance with claim 1 wherein each of said housing end walls has a pair of flow apertures diametrically offset to opposite sides of said coaxial apertures in said housing end walls, and wherein said sealing members have diametrically offset apertures which will align with said offset apertures in said housing end walls during rotation to provide passages through said cylindrical member and housing as said cylindrical container rotates to bring into alignment said housing apertures and said passages in said cylindrical container.

3. The treatment device in accordance with claim 2 wherein said wear plates have diametrically spaced apertures therein aligned with said offset apertures of said housing end walls.

4. The treatment device in accordance with claim 1 wherein there are included sealing elements about said shaft in said coaxial apertures of said housing end walls.

5. The treatment device in accordance with claim 1 wherein said resiliently deflectable biasing elements are elastomeric.

6. The treatment device in accordance with claim 4 wherein said wear plates have a central web and a frusto-toroidal convex surface portion extending thereabout disposed towards said biasing element.

7. The treatment device in accordance with claim 6 wherein said biasing elements have a central web and a frusto-toroidal concave surface portion extending thereabout and seating said convex surface portion of said wear plate.

8. The treatment device in accordance with claim 1 wherein said circular sealing members are elastomeric.

9. The treatment device in accordance with claim 1 wherein the outer surface of said circular bearing elements lies in a plane and said circular sealing elements project axially only a small distance beyond said plane of die outer surface of the circular bearing elements and said bearing elements and compression of said sealing elements under load is limited to said distance.

10. The treatment device in accordance with claim 1 wherein said cylindrical container is of wheel-like cross section with a hub providing the passage therethrough for said shaft and spokes dividing the interior of said container into a series of sectors.

11. The treatment device in accordance with claim 8 wherein said circular sealing element is of cooperating wheel-like configuration with a hub and spokes, said sealing element spokes being seated on said spokes of said container.

12. A dynamic rotating seal assembly for placement between a pair of relatively rotating members and comprising:

(a) a resiliently deflectable biasing element adapted to be placed adjacent the opposing surface of one of the relatively rotating members;

(b) a generally circular wear plate adjacent the inner surface of the biasing element;

(c) a resiliently compressible generally circular sealing member adjacent the inner surface of said wear plate and adapted to be placed against the opposing surface of the other of the relatively rotating members, said sealing member being adapted to rotate with the other relatively rotating member and relative to said wear plate; and (d) a generally circular bearing member extending about said generally circular sealing member and adapted to extend about and rotate with the other relatively rotating member, said bearing member bearing upon said wear plate and said circular sealing member bearing against said wear plate and being resiliently compressible between said wear plate and the other relatively rotating member.

13. The dynamic rotating seal assembly in accordance with claim 12 wherein said resiliently deflectable biasing element is elastomeric.

14. The dynamic rotating seal assembly in accordance with claim 12 wherein said biasing element has a central web and a frusto-toroidal concave surface portion extending thereabout and seating said convex surface portion of said wear plate.

15. The dynamic rotating seal assembly in accordance with claim 12 wherein said circular sealing member is elastomeric.

16. The dynamic rotating seal assembly in accordance with claim 12 wherein the outer surface of said circular bearing elements lies in a plane and said circular sealing element projects axially only a small distance beyond said plane of the outer surface of the circular bearing element and said bearing element and compression of said sealing element under load is limited to said distance.

\* \* \* \* \*

UNITED STATES PATENT AND TRADEMARK OFFICE
CERTIFICATE OF CORRECTION

PATENT NO. : 6,568,685 B2
DATED : May 27, 2003
INVENTOR(S) : Arthur J. Milano, Jr. et al.

It is certified that error appears in the above-identified patent and that said Letters Patent is hereby corrected as shown below:

Column 5,
Line 44, "die" should be -- the --.

Column 6,
Line 15, after "biasing element" insert -- said wear plate having a central web and a frusto-toroidal convex surface portion extending thereabout and disposed towards said biasing element --

Signed and Sealed this

Sixteenth Day of September, 2003

JAMES E. ROGAN
*Director of the United States Patent and Trademark Office*